(12) United States Patent
Yin

(10) Patent No.: US 9,199,203 B2
(45) Date of Patent: Dec. 1, 2015

(54) RESILIENT ION EXCHANGE MEMBRANES PREPARED BY POLYMERIZING IONIC SURFACTANT MONOMERS

(71) Applicant: Saltworks Technologies, Inc., Vancouver, British Columbia (CA)

(72) Inventor: Xiangchun Yin, Coquitlam (CA)

(73) Assignee: Saltworks Technologies, Inc., Vancouver, British Columbia (CA)

( * ) Notice: Subject to any disclaimer, the term of this patent is extended or adjusted under 35 U.S.C. 154(b) by 0 days.

(21) Appl. No.: 14/385,786

(22) PCT Filed: Apr. 17, 2013

(86) PCT No.: PCT/CA2013/000375
§ 371 (c)(1),
(2) Date: Sep. 17, 2014

(87) PCT Pub. No.: WO2013/155608
PCT Pub. Date: Oct. 24, 2013

(65) Prior Publication Data
US 2015/0044366 A1    Feb. 12, 2015

Related U.S. Application Data

(60) Provisional application No. 61/635,349, filed on Apr. 19, 2012.

(51) Int. Cl.
*B01J 47/12* (2006.01)
*B01D 61/44* (2006.01)
*B01D 67/00* (2006.01)
*B01J 41/14* (2006.01)
*C08J 5/22* (2006.01)
*B01D 69/12* (2006.01)
*B01D 71/40* (2006.01)

(52) U.S. Cl.
CPC ............ *B01D 67/0006* (2013.01); *B01D 61/44* (2013.01); *B01D 69/125* (2013.01); *B01D 71/40* (2013.01); *B01J 41/14* (2013.01); *B01J 47/12* (2013.01); *C08J 5/2206* (2013.01); *B01D 2323/30* (2013.01)

(58) Field of Classification Search
USPC .......................................... 204/638; 427/244
See application file for complete search history.

(56) References Cited

U.S. PATENT DOCUMENTS

| | | | | | |
|---|---|---|---|---|---|
| 3,274,205 | A | * | 9/1966 | Bikales | C07D 213/20 516/15 |
| 3,673,142 | A | * | 6/1972 | Saunders et al. | 524/458 |
| 4,231,855 | A | * | 11/1980 | Hodgdon et al. | 204/630 |
| 5,118,717 | A | * | 6/1992 | Hodgdon et al. | 521/38 |
| 7,785,751 | B2 | * | 8/2010 | Yamamoto et al. | 429/493 |
| 2011/0281197 | A1 | * | 11/2011 | Daikoku et al. | 429/480 |

FOREIGN PATENT DOCUMENTS

JP    2004-146279 A    5/2004

OTHER PUBLICATIONS

The International Search Report and Written Opinion in priority application PCT/CA2013/000375 mailed Jul. 29, 2013.

* cited by examiner

*Primary Examiner* — Peter D Mulcahy
*Assistant Examiner* — Henry Hu
(74) *Attorney, Agent, or Firm* — Troutman Sanders LLP; Ryan A. Schneider; Benjamin C. Wiles

(57) ABSTRACT

A method for making a resilient ion exchange membrane comprising polymerizing a composition containing at least an ionic surfactant monomer having an ethylenic group and a long hydrophobic alkyl group filling the pores of and covering the surfaces of a porous substrate. The hydrophobic long alkyl group in the ionic surfactant monomer provides ion exchange membranes with improved mechanical properties, and good chemical stability.

10 Claims, No Drawings

RESILIENT ION EXCHANGE MEMBRANES PREPARED BY POLYMERIZING IONIC SURFACTANT MONOMERS

CROSS-REFERENCE TO RELATED APPLICATIONS

This application is a US National Stage of International Application No. PCT/CA2013/000375, filed 17 Apr. 2013, which claims the benefit of U.S. Provisional Patent Application No. 61/635,349, filed 19 Apr. 2012, each herein fully incorporated by reference.

TECHNICAL FIELD

This disclosure relates to ion-exchange membranes. More particularly, this disclosure relates to resilient and chemically stable ion exchange membranes prepared by polymerizing ionic surfactant monomers onto and within a porous matrix.

BACKGROUND

Ion exchange membranes are used in electrodialysis, electrolysis, and diffusion dialysis where selective transport of ions takes place under the influence of an ion concentration gradient or an electrical potential gradient as the driving force. Historically, ion exchange membranes have been prepared by the copolymerization of a crosslinked divinyl monomer, such as divinylbenzene or ethylene glycol dimethacrylate, with monomer-containing ion exchange groups exemplified by 2-acrylamido-2-methylpropane sulfonic acid and by monomers that can be modified after polymerization with ion exchange groups exemplified by styrene and dimethylaminopropylacrylamide.

U.S. Pat. No. 3,451,951 discloses a multi-step process for preparing ion exchange membranes using the copolymers of styrene and divinylbenzene to provide good electrochemical properties and satisfactory mechanical properties. However, the multi-step process involves the use of hazardous chemicals such as styrene, divinylbenzene, concentrated sulfuric acid, and halogenated chemicals thereby causing the manufacturing process to be costly with significant chemical disposal problems.

U.S. Pat. Nos. 4,231,855, 4,587,269 and 5,264,125 disclose one-step processes for production of ion exchange membranes directly from monomers containing ionic functional groups. The final ion exchange membranes require no further chemical reactions after polymerization. Anionic monomers for cation exchange membranes include sodium 4-vinylbenzenesulfonate, 3-sulfopropyl acrylate potassium salt, and 2-acrylamido-2-methyl-1-propanesulfonic acid. Cationic monomers for anion exchange membranes include 3-acrylamidopropyl trimethylammonium chloride, 2-acryloyloxyethyl trimethylammonium chloride, 2-methacryloyloxyethyl trimethylammonium chloride, 3-methacryloylaminopropyl trimethylammonium chloride, and vinylbenzyl trimethylammonium chloride. However, a large percentage of solvents (>40 wt % of total monomer solution) in the formula have to be used in the one-step process due to technical challenges associated with the incompatibilities between these highly polar ionic monomers and water-insoluble non-polar crosslinking monomers. The ionic monomers and hydrophobic crosslinking monomers cannot be blended together because of their large differences in polarity. High percentages of solvent content in the formulae lead to final ion exchange membranes having high-water contents and poor ion-selective permeabilities. In addition, in order to restrain the osmostic swelling of hydrophilic and ionic components of ion exchange membranes, large amounts of crosslinking monomers (>50 mol % of the total monomer contents) have to be used in the membrane formulae, making the final membranes brittle in nature. Ion exchange membranes from the one-step process generally have poor mechanical properties.

SUMMARY

The embodiments of the present disclosure pertain to methods for producing resilient ion exchange membranes, and to resilient ion exchange membranes produced thereby.

An exemplary embodiment of the present disclosure pertains to a method for producing a resilient ion exchange membrane comprising polymerizing a composition containing at least an ionic surfactant monomer having an ethylenic group and a long hydrophobic alkyl group.

An exemplary method comprises the steps of (1) selecting a porous substrate, (2) saturating the porous substrate with a homogenous solution comprising: (i) a polymerizable ionic surfactant monomer, (ii) a crosslinking monomer with two or more ethylenic groups, (iii) a free radical initiator, (iv) a solvent selected for solubilizing and maintaining the ionic monomers, the crosslinking monomer and the free radical initiator into a homogenous solution, and optionally (v) a hydrophilic ionic monomer, (3) removing excess homogenous solution from the saturated porous substrate to form an impregnated porous substrate, (4) stimulating the free radical initiator to initiate a polymerization reaction to form a homogenous cross-linked ion-transferring polymer substantially filling the pores and substantially covering the surfaces of the porous substrate thereby forming the resilient ion exchange membrane, (5) washing the resilient ion exchange membrane to remove excess solvent, and (6) immersing the washed resilient ion exchange membrane in a sodium chloride solution to exchange the ion-transferring polymer into its sodium or chloride form.

According to one aspect, the process disclosed herein can be used to produce resilient anion exchange membranes by impregnating a porous substrate with a homogenous solution comprising a quaternary ammonium cationic surfactant monomer, a crosslinking monomer, an initiator, a solvent, and optionally, a hydrophilic cationic monomer. Suitable quaternary ammonium cationic surfactant monomers are exemplified by (meth)acryloxy monomers, (meth)acrylamido monomers, and vinyl monomers. Suitable crosslinking monomers are monomers having two or more (meth)acrylate or (meth)acrylamide or vinyl groups. Particularly suitable crosslinkers are hexanediol diacrylate, ethylene glycol dimethacrylate, 1,3-butanediol dimethacrylate, 1,4-butanediol dimethacrylate, pentaerythritol triacrylate, methylenebisacrylamide, and divinylbenzene. Suitable initiators are exemplified by α-hydroxy ketones, benzoin ethers, benzil ketals, α-dialkoxy acetophenones, α-hydroxy alkylphenones, α-amino alkylphenones, acylphosphine oxides, benzophenons/amines, thioxanthone/amines, and titanocenes. A particularly suitable initiator is 4-(2-hydroxyethoxy)phenyl-(2-hydroxy-2-propyl)ketone. Suitable solvents are exemplified by diethylene glycol, diethylene glycol methyl esters, 1,3-butanediol, ethanol, isopropanol, 1-butanol, N-methyl-2-pyrrolidone, dimethylacetamide, water, and mixtures thereof. Suitable optional hydrophilic cationic monomers are exemplified by 3-acrylamidopropyl trimethylammonium chloride, 2-acryloyloxyethyl trimethylammonium chloride, 2-methacryloyloxyethyl trimethylammonium chloride, 3-methacryloylaminopropyl trimethylammonium chloride, and vinylbenzyl trimethylammonium chloride.

The resilient anion exchange membranes produced by the methods disclosed herein generally have the following properties: (i) a membrane thickness in the range of about 0.06 mm to about 0.30 mm; (ii) an electrical resistance in the range of about 1.0 $\Omega cm^2$ to about 8.0 $\Omega cm^2$; (iii) a water content in the range of about 20% to about 45% by weight; and (iv) an ion exchange capacity from the range of about 1.6 mmol to about 3.0 mmol per g of dry resin.

According to another aspect, the process disclosed herein can be used to produce resilient cation exchange membranes by impregnating a porous substrate with a homogenous solution comprising a sulfonic anionic surfactant monomer, a crosslinking monomer, an initiator, a solvent, and optionally, a hydrophilic anionic monomer. Suitable sulfonic anionic surfactant monomers are exemplified by (meth)acrylamido monomers. Suitable crosslinking monomers are monomers have two or more (meth)acrylate or (meth)acrylamide or vinyl groups. Particularly suitable crosslinkers are hexanediol diacrylate, ethylene glycol dimethacrylate, 1,3-butanediol dimethacrylate, 1,4-butanediol dimethacrylate, pentaerythritol triacrylate, methylenebisacrylamide, and divinylbenzene. Suitable initiators are exemplified by α-hydroxy ketones, benzoin ethers, benzil ketals, α-dialkoxy acetophenones, α-hydroxy alkylphenones, α-amino alkylphenones, acylphosphine oxides, benzophenons/amines, thioxanthone/amines, and titanocenes. A particularly suitable initiator is 4-(2-hydroxyethoxy)phenyl-(2-hydroxy-2-propyl)ketone. Suitable solvents are exemplified by N,N-dimethylacetamide, N-methyl-2-pyrrolidone, water, and mixtures thereof. Suitable optional hydrophilic anionic monomers are exemplified by sodium 4-vinylbenzenesulfonate, 3-sulfopropyl acrylate potassium salt, and 2-acrylamido-2-methyl-1-propanesulfonic acid.

The resilient cation exchange membranes produced by the methods disclosed herein generally have the following properties: (i) a membrane thickness in the range of about 0.06 mm to about 0.30 mm; (ii) an electrical resistance in the range of about 1.0 $\Omega cm^2$ to about 6.0 $\Omega cm^2$; (iii) a water content in the range of about 20% to about 40% by weight; and (iv) an ion exchange capacity from the range of about 1.6 mmol to about 3.2 mmol per g of dry resin.

DETAILED DESCRIPTION

The embodiments of the present disclosure pertain to resilient ion exchange membranes that have good chemical stability, good electrochemical properties, and improved mechanical stability in that they are flexible and resistant to the formation of stress lines, fractures, and the occurrence of cracking during use. The resilient ion exchange membranes disclosed herein relate to anion exchange membranes and to cation exchange membranes.

Exemplary anion exchange membranes according to the present disclosure are prepared by polymerizing a composition containing at least a quaternary ammonium cationic surfactant monomer, onto the surfaces of and within the pores of a suitable porous substrate exemplified by woven fabrics, non-woven sheet materials, and microporous substrates.

Suitable quaternary ammonium cationic surfactant monomers are exemplified by (meth)acryloxy or (meth)acrylamido monomers and their typical preparation processes have been described in U.S. Pat. Nos. 4,212,820, 4,918,228, and the reference of *Macromolecules* (1993) 26, 6121. Such (meth) acryloxy or (meth)acrylamido cationic surfactant monomers have the following formula:

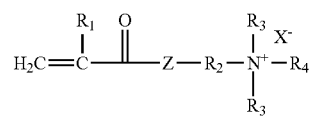

Eq. 1 wherein $R_1$ is hydrogen or a methyl group, Z is —O— or —NH—, $R_2$ and $R_3$ are $C_1$-$C_4$ alkyl groups, $R_4$ is a hydrophobic group having a long alkyl group comprising 7-22 carbon atoms, and $X^-$ is $Cl^-$, $Br^-$, $I^-$ or acetate.

Quaternary ammonium cationic surfactant monomers for anion exchange membranes according to one embodiment of the present disclosure may also be based on vinylbenzene or vinylpyridinium monomers. Exemplary processes for synthesis of vinylbenzene-based or vinylpyridinium-based cationic surfactant monomers have been disclosed in U.S. Pat. No. 4,469,873 and by Cochin et al. (1993, *Photopolymerization of micelle forming monomers. 1. Characterization of the systems before and after polymerization*. Macromolecules 26, 5755-5764).

Suitable vinylbenzyl cationic surfactant monomers are exemplified by the formula:

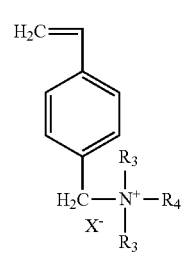

Eq. 2 wherein $R_3$ is a $C_1$-$C_4$ alkyl group, $R_4$ is a hydrophobic group having a long alkyl group comprising 7-22 carbon atoms, and $X^-$ is $Cl^-$, $Br^-$, $I^-$ or acetate.

Suitable vinylpyridinium-based cationic surfactant monomers are exemplified by the formula:

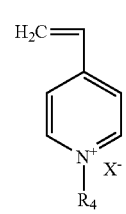

Eq. 3 wherein $R_4$ is a hydrophobic group having a long alkyl group comprising 7-22 carbon atoms, and $X^-$ is $Cl^-$, $Br^-$, $I^-$ or acetate.

In one embodiment, these quaternary ammonium cationic surfactant monomers could be used optionally with one or more hydrophilic cationic monomers to prepare an exemplary anion exchange membrane of the present disclosure. Suitable hydrophilic cationic monomers are exemplified by 3-acrylamidopropyl trimethylammonium chloride, 2-acryloyloxyethyl trimethylammonium chloride, 2-methacryloyloxyethyl trimethylammonium chloride, 3-methacryloylaminopropyl trimethylammonium chloride, vinylbenzyl trimethylammonium chloride, and the like.

Exemplary cation exchange membranes according to the present disclosure are prepared by polymerizing a composition containing at least a sulfonic anionic surfactant monomer onto the surface of and within the pores of a suitable porous substrate exemplified by woven fabrics, non-woven sheet materials, and microporous substrates.

Suitable sulfonic anionic surfactant monomers are exemplified by (meth)acrylamido monomers and their general synthesis processes have been described in U.S. Pat. No. 3,506,707. These (meth)acrylamido sulfonic anionic surfactant monomers have the following formula:

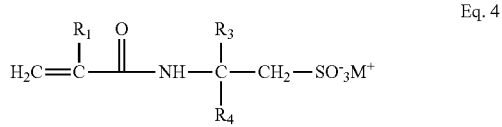

Eq. 4 wherein $R_1$ is hydrogen or a methyl group, $R_3$ is hydrogen or a $C_1$-$C_3$ alkyl group, $R_4$ is a hydrophobic group having a long alkyl group comprising 7-22 carbon atoms, and $M^+$ is $H^+$ or a salt ion.

In another embodiment, these sulfonic anionic surfactant monomers could be used optionally with one or more hydrophilic anionic monomer to prepare an exemplary cation exchange membrane of the present disclosure. Suitable hydrophilic anionic monomers are exemplified by sodium 4-vinylbenzenesulfonate, 3-sulfopropyl acrylate potassium salt, and 2-acrylamido-2-methyl-1-propanesulfonic acid, and the like.

According to one aspect, the porous substrate may comprise a woven fabric, a non-woven sheet material, or a microporous substrate.

Suitable woven fabrics may be woven from strands selected from one or more of materials exemplified by polyester, PVC, LDPE, very-low-density polyethylene (VLDPE), polypropylene, polysulfone, nylon, nylon-polyamides. Suitable polyesters are exemplified by polyglycolide or polyglycolic acid (PGA), polylactic acid (PLA), polycaprolactone (PCL), polyethylene adipate (PEA), polyhydroxyalkanoate (PHA), polyethylene teraphthalate (PET), polybutylene teraphthalate (PBT), polytrimethylene teraphthalate (PTT), polyethylene naphthalate (PEN), and VECTRAN®, a fiber spun from a liquid crystal polymer formed by the polycondensation of 4-hydroxybenzoic acid and 6-hydroxynaphthalene-2-carboxylic acid (VECTRAN is a registered trademark of Kuraray Co. Ltd., Kurashiki City, Japan). PET is particularly suitable for producing a woven fabric matrix for the flexible ion exchange membrane of the present disclosure.

Suitable non-woven sheet material may comprise sections of a single sheet comprising a material exemplified by polyester, PVC, LDPE, VLDPE, polypropylene, polysulfone, nylon, nylon-polyamides. Suitable polyesters are exemplified by polyglycolide or PGA, PLA, PCL, PEA, PHA, PET, PBT, PTT, and PEN. Also suitable is a sheet material that comprising two or more laminations of combinations of sheet material exemplified by PVC, LDPE, VLDPE, polypropylene, polysulfone, nylon, nylon-polyamides. Suitable polyesters are exemplified by polyglycolide or PGA, PLA, PCL, PEA, PHA, PET, PBT, PTT, and PEN.

Suitable microporous sheet material may comprise sections of a single sheet microporous substrate comprising a material exemplified by polyester, PVC, LDPE, VLDPE, polypropylene, polysulfone, nylon, nylon-polyamides. Suitable polyesters are exemplified by polyglycolide or PGA, PLA, PCL, PEA, PHA, PET, PBT, PTT, and PEN.

The exemplary resilient anion exchange membranes disclosed herein may be produced generally following the following steps. First, a suitable quaternary ammonium cationic surfactant monomer is provided. The selected quaternary ammonium cationic surfactant monomer may be sourced from a supplier or alternatively, it may be synthesized. The quaternary ammonium cationic surfactant monomer is dissolved in a suitable solvent to form a homogenous solution. A crosslinking monomer and a free radical initiator are then added and dissolved into the homogenous solution. It is optional, if so desired, to additionally dissolve one or more hydrophilic cationic monomers into the homogenous solution. The weight ratio of the quaternary ammonium cationic surfactant monomer to the hydrophilic cationic monomers is from about 30:1 to about 1:20, and preferably from about 20:1 to about 1:5. The homogenous solution is then applied onto a porous substrate such that the porous substrate is saturated with and impregnated with the homogenous solution. After excess homogenous solution is removed from the saturated porous substrate, the free radical initiator is stimulated to form free radicals and to initiate the polymerization. Anion exchange membranes are formed with the homogeneous crosslinked ion transferring polymers filling the pores and covering the surfaces of the porous substrate. The resulting membrane is then rinsed in water, and then converted into the chloride form by immersion in a sodium chloride (NaCl) solution.

Suitable crosslinking monomers are exemplified by monomers having two or more ethylenic groups. Particularly suitable crosslinkers are hexanediol diacrylate, ethylene glycol dimethacrylate, 1,3-butanediol dimethacrylate, 1,4-butanediol dimethacrylate, pentaerythritol triacrylate, methylenebisacrylamide, divinylbenzene, and the like.

Suitable solvents for preparing the resilient anion exchange membranes of the present disclosure are exemplified by diethylene glycol, diethylene glycol methyl esters, 1,3-butanediol, dimethylacetamide, 1,3-butanediol, isopropanol, 1-butanol, N-methyl-2-pyrrolidone, dimethylacetamide, water, and mixtures thereof. The solvent content in the homogenous solution is preferably in a range of about 20% by weight to about 45% by weight.

Suitable hydrophilic cationic monomers are exemplified by 3-acrylamidopropyl trimethylammonium chloride, 2-acryloyloxyethyl trimethylammonium chloride, 2-methacryloyloxyethyl trimethylammonium chloride, 3-methacryloylaminopropyl trimethylammonium chloride, vinylbenzyl trimethylammonium chloride, and the like.

The exemplary resilient cation exchange membranes disclosed herein may be produced generally following the following steps. First, a suitable sulfonic anionic surfactant monomer is provided. The selected sulfonic anionic surfactant monomer may be sourced from a supplier or alternatively, it may be synthesized. The sulfonic anionic surfactant monomer is dissolved in a suitable solvent to form a homogenous solution. A crosslinking monomer and a free radical initiator are added and dissolved into the homogenous solution. It is optional, if so desired, to additionally dissolve one or more hydrophilic anionic monomers into the homogenous solution. The weight ratio of the sulfonic anionic surfactant monomer to the hydrophilic anionic monomers is from about 30:1 to about 1:20, and preferably from about 20:1 to about 1:5. The homogenous solution is then applied onto a porous substrate such that the porous substrate is saturated with and impregnated with the homogenous solution. After excess homogenous solution is removed from the saturated porous substrate, the free radical initiator is stimulated to form free radicals and to initiate the polymerization. Cation exchange membranes are formed with the homogeneous crosslinked ion-transferring polymers filling the pores and covering the surfaces of the porous substrate. The resulting membrane is then rinsed in water, and then converted into the sodium form by immersion in a sodium chloride (NaCl) solution.

Suitable crosslinking monomers are exemplified by monomers having two or more ethylenic groups. Particularly suitable crosslinkers are hexanediol diacrylate, ethylene glycol dimethacrylate, 1,3-butanediol dimethacrylate, 1,4-butanediol dimethacrylate, pentaerythritol triacrylate, methylenebisacrylamide, divinylbenzene, and the like.

Suitable solvents for preparing the resilient cation exchange membranes of the present disclosure are exemplified by N,N-dimethylacetamide, N-methyl-2-pyrrolidone, water and mixtures thereof.

Suitable hydrophilic anionic monomers are exemplified by sodium 4-vinylbenzenesulfonate, 3-sulfopropyl acrylate potassium salt, 2-acrylamido-2-methyl-1-propanesulfonic acid, and the like.

Suitable free radical initiators for producing the anion exchange membranes and the cation exchange membranes of the present disclosure are exemplified by photoinitiators that release free radicals upon exposure to UV light and include among others α-hydroxy ketones free radical initiators, benzoin ethers, benzil ketals, α-dialkoxy acetophenones, α-hydroxy alkylphenones, α-amino alkylphenones, acylphosphine oxides, benzophenons/amines, thioxanthone/amines, and titanocenes. Suitable α-hydroxy ketone free radical initiators are exemplified by 2-hydroxy-1-[4-(2-hydroxyethoxy)phenyl]-2-methyl-1-propanone, 2-hydroxy-2-methyl-1-phenyl-1-propanone, 1-hydroxy-cyclohexyl-phenyl-ketone, 1-hydroxy-cyclohexyl-phenyl-ketone: benzophenone, and mixtures thereof. Suitable free radical free radical initiators are exemplified by 2,2'-Azobis(2-methylpropionitrile), benzoyl peroxide, 1,7-bis(9-acridinyl)heptane, 2-hydroxy-[4'-(2-hydroxypropoxy)phenyl]-2-methyl propanone, 4,4'bid(diethylamino)benzophenone, 4,4',4"-methylidynetris(N,N-dimethylaniline), 2-hydroxy-2-methyl-1-(4-tert-butyl)phenyl propanone, 2-Benzyl-2-(dimethylamino)-4'-morpholinobutyrophenone, 1-hydroxycyclohexyl phenylketone, 2-methyl-1-[4-(methylthio)phenyl]-2-morpholinopropan-1-one, 4-methylbenzophenone, 4-phenylbenzophenone, 2-hydroxy-2-methyl-1-phenylpropanone, 2,2'-bis-(2-chlorophenyl), 4',5,5'-tetraphenyl-1,2'biimidazole, 2,2-Dimethyoxy-2-phenylacetophenone, 4-benzoyl-4'-methyldiphenylsulphide, benzophenone, 2-chlorothioxanthone, 2,4-diethylthioxanthone, 2-isopropylthioxanthone, methylbenzoylformate, methyl-o-benzoylbenzoate, 2,4,6-trimethylbenzoyl-diphenyl phosphine oxide, ethyl(2,4,6-Trimethylbenzoyl)-phenyl phosphinate, 4-(2-hydroxyethoxy)phenyl-(2-hydroxy-2-propyl)ketone, and mixtures thereof.

The resilient ion exchange membranes produced by the process of the present disclosure comprise porous substrates impregnated with and covered by homogenous crosslinked ion-transferring polymers within, throughout, and about the substrates. The water content of the resilient ion exchange membranes can be adjusted to within selected target ranges by adjusting the percentages of the solvents in the homogenous solutions used to prepare the ion exchange membranes. The incorporation of ionic surfactant monomer with long hydrophobic alkyl groups for ion exchange membranes retains advantageous formulation process and also desired properties of the final ion exchange membranes:

1) The polarities of ionic surfactant monomers tuned compatible with any crosslinking monomer that minimum solvent content or no solvent is needed to form an initial homogenous monomer solution, making the final membrane with good ion-selective permeability;
2) Excellent mechanical property due to the incorporation of flexible alkyl groups;
3) Minimum osmotic swelling of ionic surfactant monomer units in the final membrane that crosslinking comonomer as less as 1-20 mol % of total monomer contents is needed to form resilient ion exchange membranes;
4) Tolerant to caustic degradation and chlorine oxidation;

The present disclosure will be further illustrated in the following examples. However it is to be understood that these examples are for illustrative purposes only, and should not be used to limit the scope of the present disclosure in any manner.

Example 1

Synthesis of cationic surfactant monomer N,N-dimethyl-N-dodecyl-N-(3-acrylamidopropyl)ammonium bromide N,N-dimethyl-N-dodecyl-N-(3-acrylamidopropyl)ammonium bromide was synthesized using the quaternerization reaction of N-(3-dimethylamonopropyl)acrylamide and bromododecane. In a vessel, N-(3-dimethylamonopropyl)acrylamide (31.2 g) was mixed with 1-bromododecane (74.7 g) at room temperature for 48 hours. Excess bromodecane was decanted and the transparent gel product was washed with diethyl ether and stored at cold temperature for membrane preparation.

Example 2

Preparation of Anion Exchange Membrane

N,N-dimethyl-N-dodecyl-N-(3-acrylamidopropyl)ammonium bromide (50.0 g) from Example 1 was first dissolved in diethylene glycol methyl ether (26.8 g). To this solution, crosslinking monomer hexanediol diacrylate (5.5 g) was added and stirred to form a homogenous solution. 2.5 g of a photoinitiator IRGACURE® 2959 (IRGACURE is a registered trademark of Ciba Specialty Chemical Corp., Tarrytown, N.Y., USA, and has the chemical formula: 4-(2-hydroxyethoxy)phenyl-(2-hydroxy-2-propyl)ketone) was added and dissolved into the solution. The polymerizable solution was applied onto a woven polyester cloth made with SEFAR® PET 1500 (SEFAR is a registered trademark of SEFAR Holdings AG Corp., Thal, Switzerland) wherein the woven polyester cloth has a mesh open of 151 μm, open area of 53%, and a mesh thickness of 90 μm. Excess solution was removed from the substrate by running a roller over the substrate with care being taken to exclude air bubbles from the substrate. The substrate impregnated with polymerizable solution was irradiated with UV light (wavelength 300-400 nm) for 8 min. The resulting homogenous membrane was rinsed thoroughly in water and was then placed in 10 wt % NaCl solution to convert the membrane into chloride form. The membrane has the following properties:
Membrane thickness: 0.09 mm-0.10 mm
Electrical resistance: 2.0-2.5 $\Omega cm^2$
Water content: 34 wt %
Ion exchange capacity: 2.2 mmol per gram of dry resin

Example 3

Preparation of Anion Exchange Membrane

N,N-dimethyl-N-dodecyl-N-(3-acrylamidopropyl)ammonium bromide (50.0 g) from Example 1 was first dissolved in N,N-dimethylacetamide (50.0 g). To this solution were added and dissolved 10 g of the crosslinking monomer methylenebisacryamide and 3.3 g of the photoinitiator IRGACURE® 2959. The polymerizable solution was applied onto a woven polyester cloth (SEFAR® PET 1500, mesh open 151 μm, open area of 53%, and mesh thickness of 90 μm). Excess solution was removed from the substrate by running a roller over the substrate with care being taken to exclude air bubbles from the substrate. The substrate impregnated with polymerizable solution was then irradiated with UV light (wavelength 300-400 nm) for 8 min. The resulting homogenous membrane was rinsed thoroughly in water and was then placed in 10 wt % NaCl solution to convert the membrane into chloride form. The membrane has the following properties:
  Membrane thickness: 0.09 mm-0.10 mm
  Electrical resistance: 1.8-2.4 Ωcm$^2$
  Water content: 45 wt %
  Ion exchange capacity: 2.0 mmol per gram of dry resin

Example 4

Preparation of Anion Exchange Membrane

N,N-dimethyl-N-dodecyl-N-(3-acrylamidopropyl)ammonium bromide (50.0 g) from Example 1 was dissolved in diethylene glycol methyl ether (12.5 g). Hydrophilic monomer 3-methacryloylaminopropyl trimethylammonium chloride (26.8 g; MAPTAC) was dissolved in 1,3-butanediol (26.8). The MAPTAC/butanediol solution was mixed with the N,N-dimethyl-N-dodecyl-N-(3-acrylamidopropyl)ammonium bromide/diethylene glycol methyl ether solution into a homogeneous solution. To this solution were added and dissolved the crosslinking monomer hexanediol diacrylate (51.2 g) and the photoinitiator IRGACURE® 2959 (3.0 g). The polymerizable solution was applied onto a woven polyester cloth (SEFAR® PET 1500, mesh open 151 μm, open area of 53%, and mesh thickness of 90 μm). Excess solution was removed from the substrate by running a roller over the substrate with care being taken to exclude air bubbles from the substrate. The substrate impregnated with polymerizable solution was then irradiated with UV light (wavelength 300-400 nm) for 15 min. The resulting homogeneous membrane was rinsed thoroughly in water and was then placed in 10 wt % NaCl solution to convert the membrane into chloride form. The membrane has the following properties:
  Membrane thickness: 0.09 mm-0.10 mm
  Electrical resistance: 3.0-4.2 Ωcm2
  Water content: 25 wt
  Ion exchange capacity: 1.9 mmol per gram of dry resin

Example 5

Synthesis of cationic surfactant monomer N,N-dimethyl-N-dodecyl-N-(3-methacrylamidopropyl)ammonium bromide A mixture of N-(3-dimethylamonfsopropyl)methacrylamide (51.3 g) and bromododecane (186.7 g) was reacted at room temperature for 48 h. Excess bromodecane was decanted and the transparent gel product was washed with diethyl ether. The transparent gel product crystallizes as white solid upon cooling and was stored at cold temperature (about 4° C.).

Example 6

Preparation of Anion Exchange Membrane

N,N-dimethyl-N-dodecyl-N-(3-methacrylamidopropyl) ammonium bromide (50.0 g) from Example 5 was first dissolved in diethylene glycol methyl ether (21.4 g). To this solution, crosslink monomer ethylene glycol dimethacrylate (12.5 g) was added and mixed into a homogeneous solution. IRGACURE® 2959 (2.5 g) was added and dissolved in the mixture. The polymerizable solution was applied onto a woven polyester cloth (SEFAR® PET 1500, mesh open 151 μm, open area of 53%, and mesh thickness of 90 μm). Excess solution was removed from the substrate by running a roller over the substrate with care being taken to exclude air bubbles from the substrate. The impregnated substrate with polymerizable solution was irradiated with UV light (wavelength 300-400 nm) for 20 min. The resulting homogenous membrane was rinsed thoroughly in water and then placed in 10 wt % NaCl solution to convert the membrane into chloride form. The membrane has the following properties:
  Membrane thickness: 0.09 mm-0.10 mm
  Electrical resistance: 2.8-3.5 Ωcm$^2$
  Water content: 26 wt %
  Ion exchange capacity: 1.9 mmol per gram of dry resin

Example 7

Synthesis of anionic surfactant monomer 2-acrylamido-dodecane sulfonic acid A 250-ml three-neck flask equipped with a stirrer, thermometer, and condenser was charged with acrylonitrile (16.2 g) and 1-dodecene (37.9 g). The solution was stirred under ice-salt bath. Fuming sulfuric acid (66 wt %, 35.7 g) was gradually added while the contents were maintained at less than about 5° C. The solution was then slowly raised to ambient room temperature and kept overnight. The precipitate product was filtered, washed with diethyl ether, and dried under vacuum.

Example 8

Preparation of Cation Exchange Membrane 2-acrylamido-dodecane sulfonic acid (50.0 g) from Example 7 was dissolved in N,N-dimethylacetamide (26.9 g). To this solution was added and dissolved 5.2 g of the crosslinking monomer methylenebisacryamide. IRGACURE® 2959 (2.5 g) was added and dissolved in the mixture. The polymerizable solution was applied onto a woven polyester cloth (SEFAR® PET 1500, mesh open 151 μm, open area of 53%, and mesh thickness of 90 μm). Excess solution was removed from the substrate by running a roller over the substrate with care being taken to exclude air bubbles from the substrate. The substrate impregnated with polymerizable solution was irradiated with UV light (wavelength 300-400 nm) for 8 min. The resulting homogenous membrane was rinsed thoroughly in water and was then placed in 10 wt % NaCl solution to convert the membrane into sodium form. The membrane has the following properties:
  Membrane thickness: 0.09 mm-0.10 mm
  Electrical resistance: 1.5-2.4 Ωcm$^2$ Water content: 35 wt
Ion exchange capacity: 2.9 mmol per gram of dry resin

Example 9

Preparation of Cation Exchange Membrane 2-acrylamido-dodecane sulfonic acid (50.0 g) from Example 7 and hydrophilic monomer-acrylamido-2-methyl-1-propanesulfonic acid (20.0 g) were dissolved in N,N-dimethylacetamide (40.0 g). To this solution was added the crosslinking monomer hexanediol diacrylate (46.7 g). IRGACURE® 2959 (3.2 g) was added and dissolved in the mixture. The polymerizable solution was applied onto a woven polyester cloth (SEFAR® PET 1500, mesh open 151 μm, open area of 53%, and mesh thickness of 90 μm). Excess solution was removed from the substrate by running a roller over the substrate with care being taken to exclude air bubbles from the substrate. The substrate impregnated with polymerizable solution was irradiated with UV light (wavelength 300-400 nm) for 8 min. The resulting homogeneous membrane was rinsed thoroughly in water and was then placed in 10 wt % NaCl solution to convert the membrane into sodium form. The membrane has the following properties:
Membrane thickness: 0.09 mm-0.10 mm
Electrical resistance: 2.7-3.5 $\Omega cm^2$
Water content: 27 wt %
Ion exchange capacity: 2.1 mmol per gram of dry resin

Example 10

Synthesis of anionic surfactant monomer 2-acrylamido-hexadecane sulfonic acid

A 250 ml three-neck flask equipped with a stirrer, thermometer, and condenser was charged with acrylonitrile (21.6 g) and 1-hexadecene (44.8 g). The solution was stirred under ice-salt bath. Fuming sulfuric acid (66 wt %, 35.7 g) was gradually added while the contents were maintained at less than about 5° C. The solution was then slowly raised to room temperature and kept overnight. The precipitate product was filtered, washed with diethyl ether, and dried under vacuum at room temperature.

Example 11

Preparation of Cation Exchange Membrane 2-acrylamido-hexadecane sulfonic acid (50.0 g) from Example 10 was dissolved in N,N-dimethylacetamide (21.4 g). To this solution was added 3.8 g of the crosslinking monomer methylenebisacryamide. IRGACURE® 2959 (2.2 g) was added and dissolved in the mixture. The polymerizable solution was applied onto a woven polyester cloth (SEFAR® PET 1500, mesh open 151 μm, open area of 53%, and mesh thickness of 90 μm). Excess solution was removed from the substrate by running a roller over the substrate with care being taken to exclude air bubbles from the substrate. The substrate impregnated with polymerizable solution was irradiated with UV light (wavelength 300-400 nm) for 8 min. The resulting homogenous membrane was rinsed thoroughly in water and was then placed in 10 wt % NaCl solution to convert the membrane into sodium form. The membrane has the following properties:
Membrane thickness: 0.09 mm-0.10 mm
Electrical resistance: 2.4-3.0 $\Omega cm^2$
Water content: 30 wt %
Ion exchange capacity: 2.4 mmol per gram of dry resin

Example 12

Synthesis of cationic surfactant monomer N,N-dimethyl-N-(3-alkoxy-2-hydroxylpropyl)-N-(3-acrylamidopropyl)ammonium acetate Into a 250 ml flask were added 31.2 g of N-(3-dimethylamonopropyl)acrylamide and 42.4 g of isopropanol. The solution was stirred while the base of the flask was immersed in an ice-water bath. Acetic acid (12.0 g) was added and reacted in the solution ambient room temperature for one hour. 56.2 g of $C_{12}$-$C_{14}$ alkyl glycidyl ether (Dow Chemical Company, equivalent weight 280) were added slowly into the solution at room temperature, after which, the reaction mixture was heated and kept at 45° C. for 3 h. The hydrophobic cationic monomer solution was stored at cold temperature for membrane preparation.

Example 13

Preparation of Anion Exchange Membrane

N,N-dimethyl-N-(3-alkoxy-2-hydroxylpropyl)-N-(3-acrylamidopropyl)ammonium acetate solution (50.0 g) from Example 12 was mixed with the crosslinking monomer hexanediol diacrylate (3.9 g) into a homogenous solution. IRGACURE® 2959 (1.6 g) was added and dissolved in the mixture. The polymerizable solution was applied onto a woven polyester cloth (SEFAR® PET 1500, mesh open 151 μm, open area of 53%, and mesh thickness of 90 μm). Excess solution was removed from the substrate by running a roller over the substrate with care being taken to exclude air bubbles from the substrate. The substrate impregnated with polymerizable solution was irradiated with UV light (wavelength 300-400 nm) for 8 min. The resulting homogenous membrane was rinsed thoroughly in water and then placed into a 10 wt % NaCl solution to convert the membrane into chloride form.
The membrane has the following properties:
Membrane thickness: 0.09 mm-0.10 mm
Electrical resistance: 4.2-5.0 $\Omega cm^2$
Water content: 30 wt %
Ion exchange capacity: 1.8 mmol per gram of dry resin

Example 14

Synthesis of cationic surfactant monomer N,N-dimethyl-N-(3-alkoxy-2-hydroxylpropyl)-N-(3-methacrylamidopropyl)ammonium acetate Into a 250 ml flask were added 51.3 g of N-(3-dimethylamonopropyl)methacrylamide and 65.7 g of ethanol. The solution was stirred in an ice-water bath. Acetic acid (18.0 g) was then added and reacted in the solution at room temperature for one hour. 84.0 g of $C_{12}$-$C_{14}$ alkyl glycidyl ether (Dow chemical company, equivalent weight 280) was added slowly into the solution at room temperature, after which, the reaction mixture was heated and kept at 45° C. for 3 h. The hydrophobic cationic monomer solution was stored at cold temperature for membrane preparation.

Example 15

Preparation of Anion Exchange Membrane

N,N-dimethyl-N-(3-alkoxy-2-hydroxylpropyl)-N-(3-methacrylamidopropyl)ammonium acetate solution (65.0 g) from Example 14 was mixed with the crosslinking monomer ethylene glycol dimethacrylate (7.2 g) into a homogenous solution. IRGACURE® 2959 (2.2 g) was added and dissolved in the mixture. The polymerizable solution was applied onto a woven polyester cloth (SEFAR® PET 1500, mesh open 151 µm, open area of 53%, and mesh thickness of 90 µm). Excess solution was removed from the substrate by running a roller over the substrate with care being taken to exclude air bubbles from the substrate. The substrate impregnated with polymerizable solution was irradiated with UV light (wavelength 300-400 nm) for 15 min. The resulting homogenous membrane was rinsed thoroughly in water and was then placed in 10 wt % NaCl solution to convert the membrane into chloride form. The homogenous membrane has the following properties:

Membrane thickness: 0.09 mm-0.10 mm
Electrical resistance: 4.2-5.0 $\Omega cm^2$
Water content: 30 wt %
Ion exchange capacity: 1.8 mmol per gram of dry resin Example 16

Synthesis of cationic surfactant monomer N,N-dimethyl-N-dodecyl-N-(4-vinylbenzyl)ammonium chloride Into a 200 ml flask were added 29.8 g of 4-vinylbenzyl chloride and 50 g of N,N-dimethyldodecylamine. The reaction mixture was stirred at room temperature for 24 h. The solid precipitate from the reaction was filtered, washed with diethyl ether, and dried under vacuum at room temperature.

Example 17

Preparation of Anion Exchange Membrane

N,N-dimethyl-N-dodecyl-N-(4-vinylbenzyl)ammonium chloride (50 g) from Example 16 was dissolved in N,N-dimethylacetamide (21.6 g). To this solution was added 5.5 g of the crosslinking monomer divinylbenzened and mixed to produce a homogenous solution. IRGACURE® 2959 (2.3 g) was added into the mixture and dissolved. The polymerizable solution was applied onto a woven polyester cloth (SEFAR® PET 1500, mesh open 151 µm, open area of 53%, and mesh thickness of 90 µm). Excess solution was removed from the substrate by running a roller over the substrate with care being taken to exclude air bubbles from the substrate. The substrate impregnated with polymerizable solution was irradiated with UV light (wavelength 300-400 nm) for 1 h. The resulting homogenous membrane was rinsed thoroughly in water. The membrane has the following properties:

Membrane thickness: 0.09 mm-0.10 mm
Electrical resistance: 3.5-4.2 $\Omega cm^2$
Water content: 3 30 wt %
Ion exchange capacity: 2.4 mmol per gram of dry resin Example 18

Synthesis of Cationic Surfactant Vinyl Pyridinium Based Quaternary Monomer 4-vinyl pyridine (31.5 g) was added into a 250-ml flask. The solution was stirred in an ice-water bath. Acetic acid (75.2 g) was added slowly and then the mixture was warmed to room temperature and the reaction allowed to proceed for 1 h. Then, 84.0 g of $C_{12}$-$C_{14}$ alkyl glycidyl ether (Dow chemical company, equivalent weight 280) was added slowly into the solution at room temperature, after which, the reaction mixture was heated and kept at 45° C. for 3 h. The hydrophobic cationic monomer solution was stored at cold temperature for membrane preparation.

Example 19

Preparation of Anion Exchange Membrane vinyl pyridinium-based quaternary monomer solution (30.0 g) from Example 18 was mixed with the crosslinking monomer divinylbenzene (2.4 g) until a homogenous solution was formed. IRGACURE® 2959 (1.0 g) was added and dissolved in the mixture. The polymerizable solution was applied onto a woven polyester cloth (SEFAR® PET 1500, mesh open 151 µm, open area of 53%, and mesh thickness of 90 µm). Excess solution was removed from the substrate by running a roller over the substrate with care being taken to exclude air bubbles from the substrate. The substrate impregnated with polymerizable solution was irradiated with UV light (wavelength 300-400 nm) for 1 h. The resulting homogenous membrane was rinsed thoroughly in water and was then placed in 10 wt % NaCl solution to convert the membrane into chloride form. The homogenous membrane has the following properties:

Membrane thickness: 0.09 mm-0.10 mm
Electrical resistance: 4.0-4.7 $\Omega cm^2$
Water content: 30 wt %
Ion exchange capacity: 2.0 mmol per gram of dry resin Example 20

Degradation of Ion Exchange Membranes

The caustic stabilities of the ion exchange membranes made in Examples 3 (AEM) and 8 (CEM) were tested by soaking the membranes in 0.1 mol $L^{-1}$ sodium carbonate/3.0 mol $L^{-1}$ sodium chloride solution with pH 10.8 at 60° C. The membrane performances are summarized in Table 1 below. The permselectivity of the membrane was measured in solutions of 0.6 mol $L^{-1}$ sodium chloride solution vs. 0.02 mol $L^{-1}$ sodium chloride solution.

TABLE 1

Performance of CEM* and AEM** stored under caustic conditions (pH 10.8) at 60° C.

| Storage time | CEM from Example 8 | | | AEM from Example 3 | | |
| --- | --- | --- | --- | --- | --- | --- |
| | Resistance | Permselectivity | Water content | Resistance | Permselectivity | Water content |
| 0 | 2.0 $\Omega cm^2$ | 92.0% | 35.0% | 2.2 $\Omega cm^2$ | 85.0% | 45.2% |
| 1 month | 2.0 $\Omega cm^2$ | 92.0% | 34.2% | 2.2 $\Omega cm^2$ | 85.0% | 44.3% |
| 2 months | 1.8 $\Omega cm^2$ | 92.0% | 35.6% | 2.2 $\Omega cm^2$ | 85.0% | 45.0% |

*CEM = cation exchange membrane
**AEM = anion exchange membrane

The invention claimed is:

1. A resilient cation exchange membrane comprising a homogeneous cross-linked ion-transferring polymer substantially filling pores and substantially covering surfaces of a porous substrate;
wherein the resilient cation exchange membrane is prepared by polymerizing within and about the porous substrate a composition comprising:
a sulfonic anionic surfactant monomer having a chemical structure:

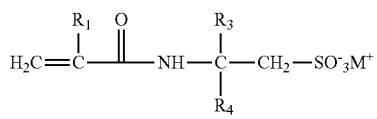

wherein $R_1$ is hydrogen or a methyl group, $R_3$ is hydrogen or a $C_1$-$C_3$ alkyl group, $R_4$ is a $C_7$-$C_{22}$ alkyl group, and M is H or a salt ion;
a crosslinking monomer comprising two or more ethylenic groups;
a free radical initiator; and
a solvent.

2. The resilient cation exchange membrane of claim 1, wherein the composition further comprises at least one hydrophilic anionic monomer selected from a group consisting of sodium 4-vinylbenzenesulfonate, 3-sulfopropyl acrylate potassium salt, and 2-acrylamido-2-methyl-1-propanesulfonic acid.

3. The resilient cation exchange membrane of claim 1, wherein the porous substrate is selected from a group consisting of a woven fabric, a non-woven sheet material, and a microporous substrate.

4. The resilient cation exchange membrane of claim 3, wherein the woven fabric is woven from strands selected from one or more of polyester, polyvinyl chloride, low-density polyethylene, very-low-density polyethylene, polypropylene, polysulfone, nylon, nylon-polyamides, polyglycolide, polyglycolic acid, polylactic acid, polycaprolactone, polyethylene adipate, polyhydroxyalkanoate, polyethylene teraphthalate, polybutylene teraphthalate, polytrimethylene teraphthalate, polyethylene naphthalate, and a fiber spun from a liquid crystal polymer formed by the polycondensation of 4-hydroxybenzoic acid and 6-hydroxynaphthalene-2-carboxylic acid.

5. The resilient cation exchange membrane of claim 3, wherein the woven fabric is woven from strands of polyethylene teraphthalate.

6. The resilient cation exchange membrane of claim 3, wherein the non-woven sheet material is selected from a group consisting of polyester, polyvinyl chloride, low-density polyethylene, very-low-density polyethylene, polypropylene, polysulfone, nylon, nylon-polyamides, polyglycolide, polyglycolic acid, polylactic acid, polycaprolactone, polyethylene adipate, polyhydroxyalkanoate, polyethylene teraphthalate, polybutylene teraphthalate, polytrimethylene teraphthalate, and polyethylene naphthalate.

7. The resilient cation exchange membrane of claim 3, wherein the non-woven sheet material comprises polyethylene teraphthalate.

8. The resilient cation exchange membrane of claim 3, wherein the non-woven sheet material is one of a single sheet material and a laminated sheet material.

9. The resilient cation exchange membrane of claim 3, wherein the microporous substrate comprises polyester, polyvinyl chloride, low-density polyethylene, very-low-density polyethylene, polypropylene, polysulfone, nylon, nylon-polyamides, polyglycolide, polyglycolic acid, polylactic acid, polycaprolactone, polyethylene adipate, polyhydroxyalkanoate, polyethylene teraphthalate, polybutylene teraphthalate, polytrimethylene teraphthalate, and polyethylene naphthalate.

10. The resilient cation exchange membrane of claim 3, wherein the microporous substrate comprises polyethylene teraphthalate.

* * * * *